US006524981B1

United States Patent
Srinivasan

(10) Patent No.: US 6,524,981 B1
(45) Date of Patent: *Feb. 25, 2003

(54) UV STABILIZED OUTDOOR COVER WITH BARRIER PROPERTIES

(75) Inventor: Ramesh Srinivasan, Simpsonville, SC (US)

(73) Assignee: BBA Nonwovens Simpsonville, Inc., Simpsonville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/471,043

(22) Filed: Dec. 22, 1999

Related U.S. Application Data

(60) Provisional application No. 60/113,709, filed on Dec. 24, 1998.

(51) Int. Cl.[7] .............................. B32B 5/26; D04H 1/56; D04H 3/16

(52) U.S. Cl. ...................... 442/382; 442/392; 442/400; 442/401; 442/409; 442/414

(58) Field of Search ................... 442/381, 382, 442/392, 400, 401, 409, 414

(56) References Cited

U.S. PATENT DOCUMENTS

| | | | |
|---|---|---|---|
| 4,070,218 A | 1/1978 | Weber | 156/167 |
| 4,340,563 A | 7/1982 | Appel et al. | 264/518 |
| 4,374,888 A | 2/1983 | Bornslaeger | 428/198 |
| 4,707,398 A | 11/1987 | Boggs | 428/224 |
| 5,004,770 A | 4/1991 | Cortolano et al. | 524/99 |
| 5,096,950 A | 3/1992 | Galbo et al. | 524/99 |
| 5,124,378 A | 6/1992 | Behrens et al. | 524/95 |
| 5,200,443 A | 4/1993 | Hudson | 524/99 |
| 5,300,647 A | 4/1994 | Malherbe et al. | 546/188 |
| 5,393,812 A | 2/1995 | Haley et al. | 524/91 |
| 5,482,765 A | 1/1996 | Bradley et al. | 428/286 |
| 5,484,645 A | 1/1996 | Lickfield et al. | 428/198 |
| 5,596,033 A * | 1/1997 | Horsey et al. | 524/100 |
| 5,834,541 A * | 11/1998 | Becker et al. | 524/119 |
| 5,939,341 A | 8/1999 | Brown et al. | 442/351 |
| 5,985,999 A | 11/1999 | Dominguez et al. | 525/74 |

FOREIGN PATENT DOCUMENTS

EP 0792 911 A2 9/1997

OTHER PUBLICATIONS

Product Specification Data Sheets for: Limestone UV Grey–SB#3, SB#4, SB#5, MB#1, MB#2, Skyblue UV–SB#1, SB#2, MB#1, MB#2 colorant compounds; Standridge Color Corp., Social Circle, GA, Oct. 21, 1998–Dec. 3, 1998.

Antioxidants, Structure and Performance; Joseph A. Stretanski, Cytec.

Pigmented Fiber Stabilization; Rangarajan Srinivasan, et al., Ciba Specialty Chemicals, Tarrytown, NY, presented in St. Louis, MO Sep. 30–Oct. 1, 1996.

Fiberstab System: A New Standard in Polypropylene Fiber Stabilization; Ciba Additives.

(List continued on next page.)

*Primary Examiner*—Cheryl A. Juska
*Assistant Examiner*—Jenna-Leigh Befumo
(74) *Attorney, Agent, or Firm*—Ostrager Chong & Flaherty LLP

(57) ABSTRACT

A nonwoven fabric with UV stability having a layer of meltblown fibers sandwiched between first and second layers of spunbonded fibers wherein each layer includes a base resin selected from the group consisting of polypropylene and polyethylene; combined with melt processable additives which are a mixture of (i) at least two hindered amine light stabilizers; (ii) a processing aid selected from the group consisting of hydroxyl amines and phosphites; and (iii) a carrier resin selected from the group consisting of polypropylene and polyethylene. Other melt processable additives include pigments which are added to provide the desired color in the resulting fabric layer.

35 Claims, 1 Drawing Sheet

OTHER PUBLICATIONS

Gas Fading—On Paper and in Practice, Sari–Beth Samuels, et al.; Cytec Industries, Stamford, CT.

Processing and Long–Term Thermal Stabilization of Polyolefins; Ciba–Geigy, Basel, Switzerland, Sep. 1992.

Brochure Re: Polyolefin Light Stabilizers; Ciba–Geigy Corp., U.S., 1992.

Performance Plus for Polymers: New Tinuvin UV Stabilizer Systems; Ciba–Geigy Corp., U.S., 1994.

Light Stabilizers—Theory and Practice, Joseph A. Stretanski, Cytec.

Pigments and their Influence on PP–Fibre Production and Quality; Claus Ripke, Clariant, May 1996.

Stabilization of Polypropylene Fibers—A New Era has Begun; J.R. Pauquet, et al., Ciba–Geigy, Basel, Switzerland.

Light Stabilizers for Polyolefins; Ciba Specialty Chemicals, Tarrytown, NY, 1998.

* cited by examiner

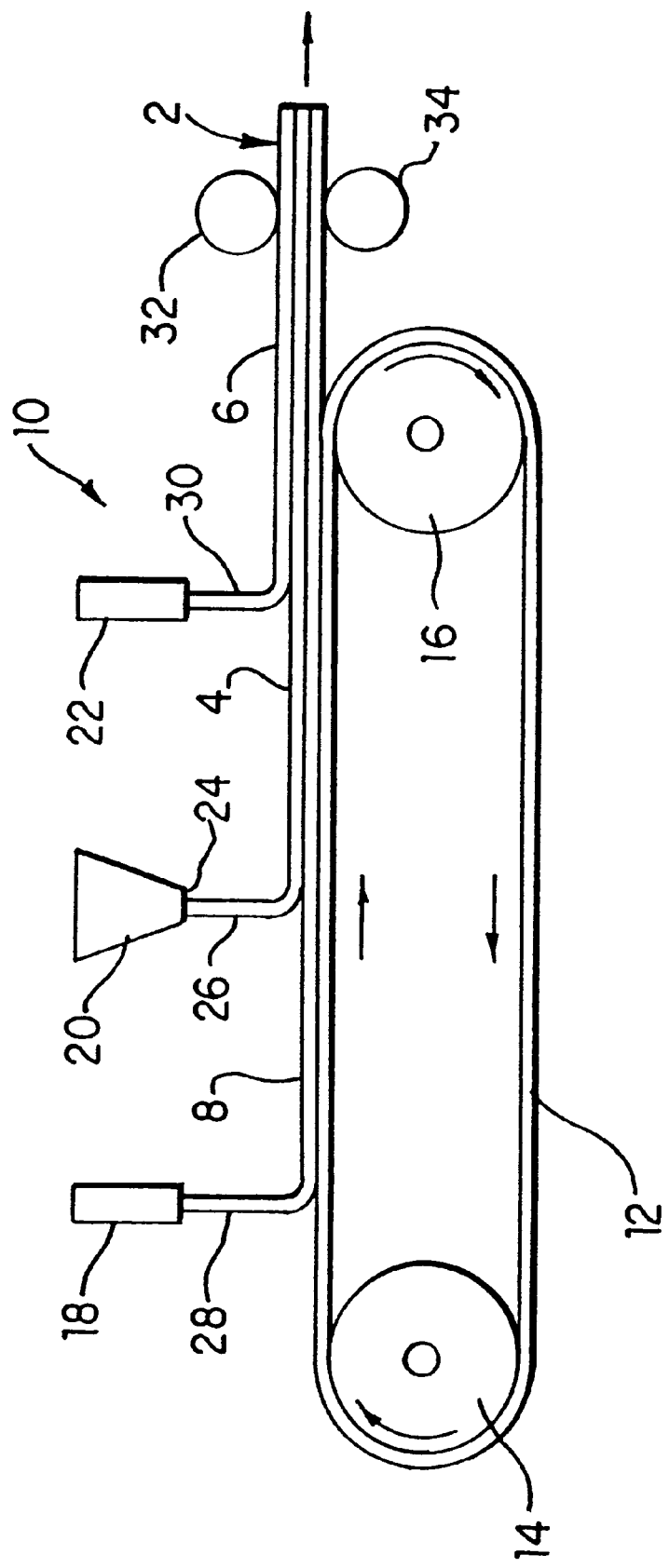

UV STABILIZED OUTDOOR COVER WITH BARRIER PROPERTIES

RELATED APPLICATION

This application claims the benefit of U.S. Provisional Application No. 60/113,709, filed on Dec. 24, 1998, which is incorporated in its entirety herein by reference.

FIELD OF THE INVENTION

The invention relates to nonwoven fabrics possessing light stability, particularly ultraviolet, and water barrier properties, suitable for substrates used to manufacture outdoor covers. In particular, the invention relates to nonwoven fabrics having at least one meltblown layer and two spunbonded layers, where each layer includes a base resin combined with at least two hindered amine light stabilizers, hydroxyl amine and phosphite processing aids; and a carrier resin of polypropylene, polyethylene or a mixture of both.

BACKGROUND OF THE INVENTION

Nonwoven fabrics possessing light stability (particularly ultraviolet) and having water barrier properties are desirable for use as substrates to manufacture outdoor covers. Outdoor covers include marine, automobile, bike and recreational vehicle covers. Such covers include protecting the vehicle from wear and tear caused by wind, rain and sunlight.

Nonwovens and nonwoven composites for such covers are available in the market. One class of such nonwoven web laminates is commonly referred to as spunbonded/meltblown/spunbonded (SMS) laminates. These SMS laminates generally consist of nonwoven outer layers of spunbonded polyolefins and an interior layer of meltblown polyolefins.

Representative of SMS laminates known in the art include U.S. Pat. No. 4,374,888 to Bornslaeger discloses an SMS fabric suitable for use as a recreational fabric in the manufacture of tents, outer garments, tarpaulins and the like. As well as U.S. Pat. No. 5,939,341 to Brown which discloses separate spunbond and meltblown layers of thermoplastic polymers containing a hindered amine light stabilizer and calcined mixed oxides.

In general hindered amine light stabilizers (HALS) are known in the art. For example, published European patent application EP 0792911 A2 to Tennesen discloses a phosphate based flame retardant combined with alkoxyamine functional hindered amine light stabilizer (NOR-HALS) used to achieve flame retardant properties that are better than those with phosphates alone.

U.S. Pat. No. 5,393,812 to Haley describes fibers and fabrics, as used clothing, upholstery and carpeting which contain about 0.01 to 3% (preferably 0.2 to 1.0%) by weight of the composition, of a light stabilizer. This patent discloses a polyolefin, a NOR HALS (alkoxy amine functional hindered amine light stabilizers) and a phosphorous flame retardant (col. 2 line 33–40; col. 4 line 62–64). Regular HALS (hindered amine light stabilizers) may be employed additionally or in place of NOR HALS.

U.S. Pat. No. 5,096,950 to Galbo discloses numerous N-OR1 alkoxy hindered amine light stabilizers.

U.S. Pat. No. 5,200,443 to Hudson discloses a nonwoven web of polypropylene polymer containing an acetylated hindered amine light stabilizer and a hindered amine substituted siloxane.

U.S. Pat. No. 5,004,770 to Cortolano; U.S. Pat. No. 5,124,378 to Behrens; and U.S. Pat. No. 5,300,647 to Malherber all disclose formulations of particular hindered amine light stabilizers.

Although HALS are known none of the art has disclosed the synergistic effect of combining at least two hindered amine light stabilizers to produce a nonwoven fabric having ultraviolet light stability, enhanced water barrier properties and enhanced durability. Thus it is a broad object of the invention to provide a nonwoven fabric with at least one meltblown layer and two spunbonded layers (SMS) having such properties.

Specifically, the fabric layers of the invention are made of a base (or virgin) resin polypropylene combined with melt processing additives. These additives are a mixture of (i) at least two hindered amine light stabilizers (HALS); (ii) processing aids which are either hydroxyl amines or phosphites or a combination of both; and (iii) a carrier resin of either polypropylene or polyethylene or a mixture of both. Pigments are also included in the formulations to impart desired color properties to the resulting fabrics. The additives are incorporated into a base polyolefinic resin to form a homogeneous blend which is then either spunbonded or melt blown and formed into the invention fabrics.

Another object of the invention is to provide a one-step process for producing a spunbond/meltblown/spunbond fabric structure where a first spunbond layer is laid on a moving conveyor belt, at least one meltblown layer of fibers is laid on top of the first layer followed by another spunbond layer. All three layers are bonded in one-step to form the nonwoven fabric.

A specific object of the invention is to provide fabric structures possessing multiple layers of meltblown webs sandwiched between spunbonded webs.

Another specific object of the invention is to provide fabric structures possessing at least one melt blown layer sandwiched between multiple layers of spunbonded webs.

Another more specific object of the invention is to provide nonwoven structures having a useful service life from six to sixty months, depending on the desired end use.

A further object of the invention is to provide a nonwoven fabric that possesses superior water barrier properties over known nonwoven fabrics, particularly spunbond fabrics.

Another specific object of the invention is to provide a nonwoven fabric that possesses superior initial physical properties as measured by grab/strip tensile tests and trapezoidal tear tests.

A further object of the invention is to provide a nonwoven fabric that does not suffer a loss of more than 50% of its initial MD, CD tensiles and initial MD, CD trapezoidal tear values at the end of its useful service life.

A further specific object of the invention is to provide a nonwoven fabric wherein the color shift is maintained within tolerances over the entire service life.

SUMMARY OF THE INVENTION

The present invention provides a nonwoven fabric having at least one layer of meltblown fibers sandwiched between two layers of spunbond fibers (SMS). The resulting fabric possessing UV light stability and water barrier properties suitable for use as a substrate to manufacture outdoor covers.

The fabric layers comprise a base resin selected from the group consisting of polypropylene and polyethylene combined with melt processable additives. The melt processable additives are a mixture of (i) at least two hindered amine light stabilizers; (ii) a processing aid selected from the group consisting of hydroxyl amines and phosphites; and (iii) a carrier resin selected from the group consisting of polypropylene and polyethylene. Pigments are also included in the formulations to impart desired color properties to the resulting fabrics.

The base resin and melt processable additives are combined to form a homogeneous blend which is then either spunbonded or meltblown to form the web layers.

The nonwoven fabric of the invention comprises multiple fabric layers. Fabric structures encompassed by the invention include spunbond-meltblown-spunbond (SMS), spunbond-meltblown-meltblown-spunbond (SMMS), spunbond-meltblown-meltblown-meltblown-spunbond (SMMMS), spunbond-spunbond-meltblown-spunbond-spundbond(SSMSS), spunbond-spunbond-meltblown-meltblown-spunbond-spundbond (SSMMSS), spunbond-spunbond-meltblown-meltblown-meltblown-spunbond-spundbond (SSMMMSS) as well as other composite nonwoven fabrics including additional spunbond or meltblown web layers.

Other objects, features and advantages of the present invention will be apparent when the detailed description of the preferred embodiments of the invention are considered with reference to the drawings, which should be construed in an illustrative and not limiting sense as follows:

BRIEF DESCRIPTION OF THE DRAWINGS

FIG. 1 is a schematic diagram showing the basic components of a system for producing the nonwoven fabric in accordance with the process of the invention.

DETAILED DESCRIPTION OF THE PREFERRED EMBODIMENTS

As used herein, the term "nonwoven web" or "nonwoven fabric" are interchangable and refer to a web/fabric that has a structure of individual fibers or filaments which are interlaid, but, not in an identifiable repeating pattern.

As used herein, the term "spunbonded fibers" refers to fibers which are formed by extruding molten thermo-plastic material as filaments from a plurality of fine, usually circular capillaries of a spinnerette. Cooling air is fed to a quenching chamber wherein the filaments are cooled. The cooling air is then sucked through a nozzle, which accelerates the flow of air. The friction between the flowing air and the filaments creates a force which draws the filaments, i.e., attenuates the filaments to a smaller diameter. The drawn filaments are then passed through a diffusor and deposited on a conveyor belt to form a nonwoven web. A conventional spinbonding technique is disclosed in U.S. Pat. No. 4,340,563 to Appel.

As used herein, the term "meltblown fibers" refers to fibers which are formed by extruding molten thermo-plastic material as threads or filaments through a plurality of fine, usually circular capillaries of a die. A high-velocity, usually heated gas (e.g., air) stream attenuates the filaments of molten thermoplastic material to reduce their diameter. Thereafter the meltblown fibers are carried by the high-velocity heated gas stream and are deposited on a collecting surface to form a web of randomly dispersed meltblown fibers. A conventional meltblowing technique is disclosed in U.S. Pat. No. 4,707,398 to Boggs.

Meltblown fibers differ from spunbonded fibers in that the extruded polymer strands have much finer diameters. These fine diameter filaments are easily dispersed by the forced hot air stream before being deposited on the collecting surface. In addition, the meltblown fibers are substantially cooled by the air so that they do not significantly bond together. Bonding of the web to retain integrity and strength occurs as a separate downstream operation.

In general, the invention provides a nonwoven fabric with UV stability and enhanced water barrier properties comprising at least one layer of meltblown fibers sandwiched between two layers of spunbond fibers. Each layer being made of a base resin selected from the group consisting of polypropylene and polyethylene combined with melt processable additives. The melt processable additives are a mixture of (i) at least two hindered amine light stabilizers; (ii) a processing aid selected from the group consisting of hydroxyl amines and phosphites; and (iii) a carrier resin selected from the group consisting of polypropylene and polyethylene. Pigments are also included in the formulations to impart desired color properties to the resulting fabrics.

The base resin is an olefinic material preferably either polyproylene or polyethylene and is typically present in amounts ranging from 80 to 99%. The base resin used must be compatible with the carrier resins in the formulations in order for homogeneous combination of the base resin with the melt processable additives. Thus, if the base resin is polypropylene the carrier resin is preferably polypropylene or a combination of polypropylene and polyethylene. A preferred base resin used for the spunbond layers of the invention is a polypropylene having a melt flow rate of 35 commercially available as Montel PH805 from Montel Polyolefins, Moltel USA, Wilmington, Del. A preferred base resin used in the meltblown layers is a polypropylene having a melt flow rate between 500 and 1500.

Preferred hindered amine light stabilizers used in the invention are 1,3,5-Triazine-2,4,6-triamine,N,N'"-[1,2-ethanediylbis[[4,6-bis-[buty(1,2,2,6,6-pentamethyl-4-piperidinyll)amino]-1,3,4-triazin-2-yl]imino]-3, 1propanediyl]]bis[N',N"-dibutyl-N',N"-bis(1,2,2,6,6-pentamethyl-4 piperidinyl) commercially available as Chimassorb™119 from Ciba Specialty Chemicals Canada, Mississauga, Ontario, Canada; dimethyl succinate polymer with 4-hydroxy-2,2,6,6-tetramethyl-1-piperidineethanol commercially available as Tinuvin™622 from Ciba Specialty Chemicals Canada, Mississauga, Ontario, Canada; Poly[[6-[(1,1,3,3,-tetramethyl butyl)amino]-1,3,5-triazine-2,4-diyl][2,2,6,6-tetramethyl-4-piperidyl)imino] hexamethylene[2,2,6,6-tetramethyl-4-piperidyl) imino]] commerically available as Chimassorb™ 944 from Ciba Specialty Chemicals Canada, Mississauga, Ontario, Canada; and 1,6-Hexanediamine, N,N'-bis(2,2,6,6-tetramethyl-4-piperidinyl)-polymer with 2,4,6, -trichloro-1,3,5-triazine, reaction products with N-butyl-1-butanamine and N-butyl-2,2,6,6-tetramethyl-4-piperidinamine commercially available as Chimassorb™2020 from Ciba Specialty Chemicals Canada, Mississauga, Ontario, Canada. The data sheets for Chimassorb™119, 944 and 2020 and Tinuvin™622 are all incorporated herein by reference.

At least two hindered amine light stabilizers (HALS) are combined in the invention formulations and are preferably combined in a ratio of 9:1 to 1:9. The total hindered amine light stablizers are present in the resulting fabric layer in amounts ranging from 300 ppm to 25,000 ppm. The combination of using two HALS provides for increased loading of the UV stabilizer materials in the final spunbond product. In addition, the synergistic effect of the two HALS result in a product with an increased durability and product life.

The preferred processing aids used in the invention are hydroxyl amine (bis (hydrogenated tallow alkyl) amines, oxidized and Tris(2,4-di-tert-butylphenyl)phosphite These materials are either used in the formulations separately or in combination. The processing aids are present in the fabric layer in amounts ranging from 100 ppm to 10,000 ppm.

Preferred carrier resins are polyethylenes with a melt index from 1 to 20 and polypropylenes with a melt flow rate between 2 and 60. The carrier resin may also be a mixture of polypropylene and polyethylene, which is combined in a ratio of 9.5:1 to 1:9.5.

As discussed in more detail herein the fabric layer may further include color pigments added at levels up to 10wt % to the color concentrate formulations prior to spunbonding or meltblowing. If a white product is desired the white pigment formulations include $TiO_2$ which was unexpectedly found to aid in the spinnability and extrudability of the formulations. Typically, it is difficult to spin formulations having a melt flow rate of 85 since in doing so generally results in broken fibers and a undesired web is produced.

The melt processable additives are combined together prior to mixing with the base (virgin) resin. The melt processable additive formulations preferably have a melt flow rate of less than 85 to aid in producing a homogenous blend. If a color pigment is incorporated into the formulations, a melt flow rate of less than 35 is preferred. Typically, between 1 to 20 wt % of the melt processable additive formulations are blended with between 80 to 99 wt % of the base resin. This blend is then formed into either a spunbond or meltblown web.

In general the nonwoven fabrics of the invention are made by combining a base resin with a UV color concentrate and a UV augmentor. The fabric layers of the nonwovens include 80 to 99.0 wt % of a base polypropylene or polyethylene resin; up to 10 wt % of the ultraviolet color concentrate and up to 10 wt % of the ultraviolet augmentor formulation. Both the ultraviolet color concentrate and augmentor formulations have melt flow rates less than 85.

The ultraviolet color concentrates have the following general formula:

15.0 to 50.0 wt % of at least one hindered amine light stabilizers;

up to 10.0 wt % of a processing aid;

up to 10.0 wt % pigments; and the remainder of the formulation comprises a polypropylene or polyethylene carrier resin or a mixture of both.

The hindered amine light stabilizers in the color concentrate include Chimassorb™ 119, Chimassorb™ 944, Chimassorb™ 2020 and Tinuvin™622 which are all commerically available from Ciba Specialty Canada, Mississauga, Ontario, Canada.

A processing aid used in the color concentrate includes the Fiberstab™ FS 301 system commericially available by Ciba Specialty Chemicals Canada, Mississauga, Ontario, Canada, which is a 1:1 combination of hydroxyl amine (bis(hydrogenated tallow alkyl)amines oxidized and Tris(2, 4-di-tert-butylphenyl) phosphite. The later component Tris (2,4-di-tert-butylphenyl) phosphite is also available separately under the tradename Irgafos™168 from Ciba Specialty Chemicals Canada and can be used in the formulations alone without the hydroxyl amine. The data sheet for FS 301 system and Irgafos™168 is incorporated herein by reference.

The processing aid performs the critical function of reducing the sudden increases in the viscosity of the homopolymer PP, usually caused by the introduction of hindered amines into the polypropylene. Although such function can be performed by traditional phenolic antioxidants, they are known to cause yellowing of the polypropylene fabric, unlike the processing aids used in the invention formulations.

As mentioned, formulations incorporating the FS 301 processing system are added up to 10 wt %, preferably between 2–5 wt %. In the spunbond or meltblown fabric layer the processing aid is present in amounts ranging from 100 to 10,000 ppm, preferably between 1000 to 3000 ppm.

The pigments in the formulations are used to impart color. Various pigments are incorporated into the formulations depending on the desired color of the resulting fabric. The pigments used include: Natural Brown UV, Dark Gull Grey UV, Neutral UV Grey, Limestone UV Grey, Charcoal UV Grey #1, Charcoal Grey #2, Brilliant UV Blue PP, Brilliant UV Blue, Limestone UV Grey#2, Desert Dust UV #1-PP, Desert Dust UV #2-PP, Desert Dust UV #1-PE and Desert Dust UV #2-PE all available commericially from Standridge Color Corporation, Social Circle, Ga. The respective data sheets for each of the pigments are incorporated herein by reference. The pigments used include inorganic pigments, organic pigments, metal oxides, combinations of these pigments as well as other materials. As previously mentioned, if a white product is desired the formulations also include $TiO_2$. The pigments are typically added at levels of up to 40 wt %, preferably up to 10 wt %, in the UV color concentrate formulations.

The selection of the carrier resin is very important in achieving the desired melt flow characteristics of the concentrate. Both polypropylene and polyethylene carrier resins were found to be suitable for incorporating the loadings of the UV stabilizer and the processing aid systems. However, since the UV stabilizers typically have molecular weights significantly lower than that of the homopolymer polypropylene, only polypropylene and polyethylene carriers with the right viscosity could be used to produce the fabrics of the invention.

Preferred polypropylene carrier resins found to result in the highest melt stability in the spunbond formulations include Montel Profax™ 6301 and Montel Profax™ 6501, both in powder form, commericially available from Montell Canada, Varennes, Quebec, Canada. Profax™ 6301 has a melt flow rate of 11 and Profax™ 6501 has a melt flow rate of 4. The data sheets for Montel Profax™ 6301 and Montel Profax™ 6501 are incorporated herein by reference. Preferred polypropylene resins in the meltblown layer have a melt flow range between 500–1500.

Preferred polyethylene carrier resins used in the formulations include polyethylene resins having a melt index less than 20, available commericially from Mobil Polymers, Edison, N.J.

The ultraviolet augmentor formulations have the following general formula:

15.0 to 50.0 wt % of a hindered amine light stabilizer;

1.0 to 5.0 wt % of a phosphite processing aid; and the remainder a carrier resin that is polyethylene or polypropylene or mixtures thereof.

The invention also provides a method of making a nonwoven fabric with UV stability and enhanced water barrier properties by combining a base resin selected from the group consisting of polypropylene and polyethylene with melt processable additives to form a homogeneous blend. The melt processable additives are a mixture of (i) at least two hindered amine light stabilizers; (ii) a processing aid selected from the group consisting of hydroxyl amines and phosphites; and (iii) a carrier resin selected from the group consisting of polypropylene and polyethylene. The homogeneous blend is either spunbond or meltblown. The meltblown web and the spunbonded web layers contain the same component materials however, the exact formulations used in making each layer may either be the same or different depending on the desired properties of the resulting fabric. In all embodiments the multiple web layers are bonded in one-step to form the nonwoven fabric layer.

The nonwoven fabric of the invention comprises at least three layers, at least one meltblown layer sandwiched between two spunbonded layers. However, other structures are encompassed by the invention including those having additional meltblown or spunbonded web layers. Examples of such fabric structures include spunbond-meltblown-spunbond (SMS), spunbond-meltblown-meltblown-spunbond (SMMS), spunbond-meltblown-meltblown-meltblown-spunbond (SMMMS), spunbond-spunbond-meltblown-spunbond-spundbond (SSMSS), spunbond-spunbond-meltblown-meltblown-spunbond-spundbond (SSMMSS), spunbond-spunbond-meltblown-meltblown-meltblown-spunbond-spundbond (SSMMMSS) as well as other composite nonwoven fabrics including additional spunbond or meltblown web layers. In all the embodiments of the invention, the meltblown or spunbonded fiberous webs are laid in the manner desired followed by thermally bonding the layers together.

FIG. 1 is a schematic diagram showing the basic components of a system for producing the nonwoven fabric in accordance with the process of the invention.

As previously described the nonwoven fabric of the invention has at least one meltblown layer sandwiched between two spunbond layers (SMS) where the layers are made from a homogeneous blend of a base resin and a combination of melt processable additives. All three of these layers are bonded together by the application of heat and pressure to form a SMS, or other, fabric laminate. The spunbonded fabric layers may be prebonded on the process line by heated press rolls providing structural integrity to the fabric.

The meltblown fabric layer or web can be prepared by extruding a fiber-forming thermoplastic polymer resin in molten form through a plurality of fine, usually circular capillaries of a die. A high-velocity, usually heated gas (e.g., air) stream attenuates the filaments of molten thermoplastic material to reduce their diameter. Thereafter the meltblown fibers are carried by the high-velocity heated gas stream and are deposited on a collecting surface to form a nonwoven web of randomly dispersed meltblown fibers. In accordance with the preferred embodiment, the thermoplastic polymeric microfibers of meltblown fabric layer 4 are polypropylene. Polymers other than polypropylene, such as nylon, polyethylene, polyester, and copolymers and blends thereof, may also be used.

Each of the spunbonded fabric layers may be produced by continuously extruding the homogeneous blend through a plurality of fine, usually circular capillaries of a spinnerette. Pressurized cooling air is fed to a quenching chamber wherein the filaments are cooled. The cooling air is then accelerated through a nozzle by a positive air pressure. The friction between the flowing air and the filaments creates a force which draws the filaments, i.e., attenuates the filaments to a smaller diameter. The filaments are drawn to achieve molecular orientation and tenacity. The continuous filaments are then deposited in a substantially random manner to form a web of substantially continuous and randomly arranged, molecularly oriented filaments. The preferred base polyolefinic resin used to make spunbonded fabric layers is polypropylene, although nylon, polyethylene, polyester, and copolymers and blends thereof can be used.

The nonwoven fabric of the invention has a least one layer. Multiple fabric layers are encompassed by the invention, with numerous variations of spunbonded and meltblown fabric layers possible. Multiple fabric layers are then bonded together in one-step by the application of heat and pressure to form the desired fabric composite.

For illustrative purposes, the production of a spunbond-meltblown-spunbond (SMS) fabric structure of the invention is described. The production line illustrated in FIG. 1 can be operated at a speed in the range of 20 to 180 m/min, preferably about 125 m/min. The equipment of production line 10 consists of an endless foraminous forming belt 12 wrapped around rollers 14 and 16. The belt 12 is driven in the direction shown by the arrows. The production line 10 includes a forming machine which has three stations: spunbond station 18, meltblown station 20 and spunbond station 22. In other embodiments, depending on the desired fabric structure, additional meltblown or spunbond stations may be operating.

For the SMS structure, first, the spunbond station 18 lays down a web 8 of spunbonded fibers 28 onto the carrier belt 12. Then the meltblown station 20 lays down a web 4 of meltblown fibers 26 onto the spunbonded web 8. Lastly, the spunbond station 22 lays down a web 6 of spunbonded fibers 30 onto the meltblown web 4.

The spunbond stations 18 and 22 are conventional extruders with spinnerettes which form continuous filaments of a polymer/melt additive and deposit those filaments onto the forming belt 12 in a random interlaced fashion. Each spunbond station may include one or more spinnerette heads depending on the speed of the process and the particular polymer being used. Forming spunbonded material is a conventional process well known in the art.

The meltblown station 20 consists of a die 24 which is used to form microfibers 26. As the thermoplastic polymer exits the die 24, the polymer threads are attenuated and spread by high-pressure fluid, usually air, to form microfibers 26. The microfibers 26 are randomly deposited on top of the spunbond layer 8 and form a meltblown layer 4. The construction and operation of the meltblown station 20 for forming microfibers 26 are well known in the art.

In accordance with the preferred embodiment of the invention, the meltblown fabric layer has a basis weight of 5–15 gsy, while the total basis weight of the spunbonded fabric layers is 50–75 gsy. However, in accordance with the broad concept of the invention, the basis weight of the meltblown fabric layer is approximately 10–25% of the total fabric and can be in the range of 0.5 to 20.0 gsy, while the total basis weight of the spunbonded fabric layers can be in the range of 6.0 to 100.0 gsy. Further, in accordance with the invention, the meltblown fibers have an average diameter of 1–10 μm, preferably 3–5 μm, while the spunbonded fibers have an average diameter of 10–30 μm, preferably 12–20 μm. The SMS fabric laminate in accordance with the preferred embodiment has a mean pore size in the range of 5–50 μm, preferably about 20 μm. The molten polypropylene used to make the meltblown fibers has a molecular weight distribution in the range of about 1.8–5.0, preferably 3.6, and a melt flow rate in the range of about 400–3000 grams/10 minutes, preferably about 1300 grams/10 minutes, whereas the molten polypropylene used to make the spunbonded fibers has a molecular weight distribution in the range of about 1.8–5.0, preferably 2.5–2.7, and a melt flow rate in the range of about 10–100 grams/10 minutes, preferably about 35 grams/10 minutes.

Out of the forming machine, the SMS fabric laminate web 2 is then fed through. bonding rolls 32 and 34. The surfaces of the bonding rolls 32 and 34 are provided with a pattern of raised lands which apply heat and pressure to thermally bond the three layers together. The bonding rolls are heated to a temperature which causes the spunbonded polymer to soften. As the spunbond webs pass between the heated bonding rolls 32 and 34, the composite material is compressed and heated by the bonding rolls in accordance with the pattern on the rolls to create a pattern of discrete bonding areas. The bond pattern is selected to provide desired fabric strength characteristics. The pattern bonding area is not limited in accordance with the present invention, although pattern bonding areas in the range of 5–250%, preferably 14–19%, of the total fabric area are feasible.

Other fabric structures encompassed by the invention are formed as described by the process above and as illustrated in FIG. 1 with the number of spunbond stations 18 or 22 and meltblown stations 20 depending on the number of layers in the desired end fabric.

In contrast to prior art systems where each spunbond or meltblown web is formed separately and thermally bonded twice, first to form the layer and second to form the composite, the present invention provides a one-step thermal bonding process. Specifically, in a SMS fabric, a spunbond web of fibers is laid first on a moving conveyor belt, a meltblown web of fibers is laid on top and a second spunbond web of fibers is laid on top of the meltblown web, all three webs are then thermally bonded together in one-step on the same process line.

The following examples are for purposes of illustration only and this invention should not be considered to be limited by any recitation used therein.

EXAMPLE 1

An outdoor cover substrate possessing UV stability and enhanced barrier properties was produced. Two samples were produced, one an SMS fabric was made using limestone UV grey pigment and the other an SMMS fabric using a skyblue UV pigment. The fabrics were made according to the following formulations.

Spunbond Layer Formulations

The spunbond layers were made using a combination of UV color concentrate, UV augmentor and a carrier resin. The UV color concentrate for this layer was prepared mixing the following ingredients:

(1) 18 wt % of a hindered amine light stabilizer consisting of 1,6-Hexanediamine, N,N'-bis(2,2,6,6-tetramethyl-4-piperidinyl)-polymer with 2,4,6,-trichloro-1,3,5-triazine, reaction products with N-butyl-1-butanamine and N-butyl-2,2,6,6-tetramethyl-4-piperidinamine commercially available as Chimassorb™2020 from Ciba Specialty Chemicals Canada, Mississauga, Ontario, Canada;

(2) 3 wt % of a processing aid consisting of Tris(2,4-di-tert-butylphenyl) phosphite commercially available as Irgafos™168 from Ciba Specialty Chemicals Canada; and (3) The remaining amount of the concentrate consists of a polypropylene carrier resin which, in this example, includes either a limestone UV grey pigment or a skyblue UV pigment commericially available from Standridge Color Corporation, Social Circle, Ga. The polypropylene carrier resin used has a melt flow rate of 4 and is available commercially from Montel Canada, Varennes, Quebec, Canada. The amount of pigment in the UV color concentrate formulations was up to 40 wt. %, preferably up to 10 wt %.

A UV augmentor was prepared mixing the following ingredients:

(1) 30 wt. % of a hindered amine light stabilizer consisting of Poly[[6-[(1,1,3,3,-tetramethyl butyl)amino]-1,3,5-triazine-2,4-diyl][2,2,6,6-tetramethyl-4-piperidyl)imino]hexamethylene[2,2,6,6-tetramethyl-4-piperidyl)imino]] commerically available as Chimassorb™ 944 from Ciba Specialty Chemicals Canada, Mississauga, Ontario, Canada;

(2) 2 wt % of a processing aid consisting of Tris(2,4-di-tert-butylphenyl) phosphite commercially available as Irgafos™ 168 from Ciba Specialty Chemicals Canada; and (3) The remaining amount of the augmentor consists of a polypropylene carrier resin, but in other embodiments may also be a polyethylene resin or a mixture of both.

3 wt % of the UV color concentrate and 2.67 wt. % of the TV augmentor was then combined with 94.33 wt % of base polypropylene resin to form a homogeneous blend. In the spunbonded layers the base polypropylene used was Amoco 10-7957 F which has a melt flow rate of 35. The data sheet for Amoco 10-7959 F. is incorporated herein by reference.

Meltblown Layer Formulations

The meltblown layers were made using a combination of UV color concentrate, UV augmentor and a carrier resin. The UV color concentrate for this layer was prepared mixing the following ingredients:

(1) 18 wt % of a mixture of hindered amine light stabilizers consisting of a 9:1 ratio of 1,3,5-Triazine-2,4,6-triamine,N,N'''-[1,2-ethanediylbis[[4,6-bis-[buty(1,2,2,6,6-pentamethyl-4-piperidinyl)amino]-1,3,4-triazin-2-yl]imino]-3,1 propanediyl]]bis[N',N''-dibutyl-N',N''-bis(1,2,2,6,6-pentamethyl-4 piperidinyl) (commercially available as Chimassorb™119) and dimethyl succinate polymer with 4-hydroxy-2,2,6,6-tetramethyl-1-piperidineethanol (commercially available as Tinuvin™622). Both Chimassorb™119 and Tinuvin™622 are available from Ciba Specialty Chemicals Canada, Mississauga, Ontario, Canada;

(2) 3 wt. % of a processing aid consisting of a 1:1 ratio of hydroxyl amine (bis(hydrogenated tallow alkyl)amines oxidized and Tris (2,4-di-tert-butylphenyl) phosphite (commercially available as Fiberstab™ FS 301 system by Ciba Specialty Chemicals Canada, Mississauga, Ontario, Canada); and (3) The remaining amount of the concentrate consists of a polypropylene carrier resin which, in this example, includes either a limestone UV grey pigment or a skyblue UV pigment commercially available from Standridge Color Corporation, Social Circle, Ga. The polypropylene carrier resin used has a melt flow rate of 4 and is available commercially from Montel Canada, Varennes, Quebec, Canada. The amount of pigment in the UV color concentrate formulations was up to 40 wt. %, preferably up to 10 wt %.

A UV augmentor was prepared mixing the following ingredients:

(1) 50 wt. % of a hindered amine light stabilizer consisting of Poly[[6-[(1,1,3,3,-tetramethyl butyl)amino]-1,3,5-triazine-2,4-diyl][2,2,6,6-tetramethyl-4-piperidyl)imino]hexamethylene [2,2,6,6-tetramethyl-4-piperidyl)imino]] commercially available as Chimassorb™ 944 from Ciba Specialty Chemicals Canada, Mississauga, Ontario, Canada;

(2) 3 wt % of a processing aid consisting of Tris(2,4-di-tert-butylphenyl) phosphite commercially available as Irgafos™168 from Ciba Specialty Chemicals Canada; and (3) The remaining amount of the augmentor consists of a polypropylene carrier resin, but in other embodiments may also be a polyethylene resin or a mixture of both.

3 wt % of the UV color concentrate and 1.6 wt. % of the UV augmentor was then combined with 95.4 wt % of base polypropylene resin to form a homogeneous blend. In the meltblown layers the base polypropylene used was Exxon 3546G which has a melt flow rate of 1300. The data sheet for Exxon 3546G is incorporated herein by reference.

In accordance with the process of the invention samples of nonwoven fabrics having either one meltblown layer or two sandwiched between two spunbonded fabric layers (SMS and SMMS structures) were made. The webs were laid on a moving conveyor belt (as illustrated in FIG. 1) in the order specified and then thermally bonded together. Each total sample laminate weight was 90 gsm. The weight of each spunbond layer in the fabrics formed was approximately 41.25 gsm. The weight of the meltblown layer in the SMS fabric was approximately 9 gsm and each meltblown layer in the SMMS fabric was 4.5 gsm respectively. A summary of the weight % of the components in the spunbond and melblown layers are listed in TABLE 1 below.

TABLE 1

WT. % OF COMPONENTS IN SPUNBOND/MELTBLOWN LAYERS

| COMPONENT | SPUNBOND LAYER | MELTBLOWN LAYER |
|---|---|---|
| BASE POLYPROPYLENE | 94.33% | 95.40% |
| UV COLOR CONCENTRATE | 3.00% | 3.00% |
| UV AUGMENTOR | 2.67% | 1.60% |

Physical properties and measurements for the SMS and SMMS samples were taken and are summarized in TABLES 2 and 3 below.

Hydrostatic head testing was performed using the Alfred Suter Hydrostatic Pressure Testing Type 503. In general hydrostatic head values over 30 indicate that the fabric has good water barrier properties. As shown in TABLES 2 and 3, the SMS fabric had a hydrostatic head value from 36–33, and the SMMS fabric had a hydrostatic head of 55. Although the total weight of the meltblown layer in both samples was the same, 9 gsm, the SMMS fabric with two meltblown layers resulted in an increase in the water barrier property.

Several variations of the nonwoven fabric made in this example in accordance with the invention process are possible. Although the fabric structure is described in this example as SMMS composite structure, other additional composites are possible. Examples include SSMSS, SSMMSS, or other combinations. Such composites are made in a one-step process wherein all the layers are eventually thermally bonded together.

An advantage of this invention over prior practice in this area is in the provision of nonwoven fabrics having UV light stability and enhanced water barrier properties.

EXAMPLE 2

Samples 5 to 52, summarized in TABLES 4, 5, 6 and 7 below, illustrate various melt processable additive formulations that are used to produce the fabric layers in accordance with the process of the invention.

TABLES 4 and 5 illustrate various melt processable additives used to form the spunbonded layers of the fabric. TABLES 6 and 7 illustrate various melt processable additives used to form the meltblown layers of the fabric.

The wt. %'s listed in the TABLES refer to the additive formulations. These formulations are combined in amounts ranging between 1 to 20 wt % with a base resin of either polypropylene or polyethylene in amounts ranging between 80 to 99 wt % to form a blend that is then either spunbonded or meltblown into a fabric layer.

The total amount of hindered amine light stabilizers (HALS) present in each fabric layer from each Sample is also indicated in TABLES.

In general, in Samples 5 to 52 the melt processable additives contain:

TABLE 2

90 gsm LIMESTONE UV GREY (SMS)

| NO | BASIS WT. gsm | CD GRAB TENSILE gm/in | CD GRAB ELONG % | MD GRAB TENSILE gm/in | HYDRO-HEAD cm | CALIPER mils | MD TRAP TEAR, gms | CD TRAP TEAR, gms |
|---|---|---|---|---|---|---|---|---|
| 1 | 92.00 | 25.00 | 91.00 | 48.00 | 36.00 | 19.00 | 14.00 | 35.00 |
| 2 | 95.00 | 22.00 | 82.00 | 51.00 | 33.00 | 19.00 | 14.00 | 37.00 |
| 3 | 95.00 | 26.00 | 91.00 | 61.00 | 33.00 | 19.00 | 15.00 | 34.00 |

TABLE 3

90 gsm SKYBLUE UV GREY (SMMS)

| NO | BASIS WT. gsm | CD GRAB TENSILE gm/in | CD GRAB ELONG % | MD GRAB TENSILE gm/in | HYDRO-HEAD cm | CALIPER mils | MD TRAP TEAR, gms | CD TRAP TEAR, gms |
|---|---|---|---|---|---|---|---|---|
| 4 | 91.50 | 33.00 | 105.00 | 55.00 | 55.00 | — | 15.00 | 30.00 |

(1) At least one hindered amine light stabilizers (HALS).

HAL-1: which is 1,3,5-Triazine-2,4,6-triamine,N,N'''-[1,2-ethanediylbis[[4,6-bis-[buty(1,2,2,6,6-pentamethyl-4-piperidinyll)amino]-1,3,4-triazin-2-yl]imino]-3,1 propanediyl]]bis[N',N''-dibutyl-N',N''-bis(1,2,2,6,6-pentamethyl-4 piperidinyl) (commercially available as Chimassorb®119);

HAL-2: which is dimethyl succinate polymer with 4-hydroxy-2,2,6,6-tetramethyl-1-piperidineethanol (commercially available as Tinuvin®622); or HAL-3: which is 1,6-Hexanediamine, N,N'-bis(2,2,6,6-tetramethyl-4-piperidinyl)-polymer with 2,4,6,-trichloro-1,3,5-triazine, reaction products with N-butyl-1-butanamine and N-butyl-2,2,6,6-tetramethyl-4-piperidinamine (commercially available as Chimassorb™2020).

Chimassorb™119, Chimassorb™2020 and Tinuvin®622 are available from, Ciba Specialty Chemicals Canada, Mississauga, Ontario, Canada.

(2) A processing aid ("Process Aid").

Processing Aid 1: is a 1:1 ratio of hydroxyl amine (bis(hydrogenated tallow alkyl)amines oxidized and Tris(2,4-di-tert-butylphenyl) phosphite (commercially available as Fiberstab FS 301 system by Ciba Specialty Chemicals Canada, Mississauga, Ontario, Canada); and Processing Aid 2: is Tris(2,4-di-tert-butylphenyl) phosphite commercially available as Irgafos™168 from Ciba Specialty Chemicals Canada.

(3) The remaining melt processable additives consist of either a polypropylene or polyethylene carrier resin in combination with a pigment. The polypropylene carrier resin ("PP") used in the formulations for the spunbonded layers have a melt flow rate between 2 and 35. The polyethylene carrier ("PE") used in the sample formulations for the spunbonded layers have a melt index between 1 and 20.

In the meltblown layers the polypropylene carrier resin (PP) has a melt flow rate between 500 and 1500.

TABLE 4

SPUNBOND LAYER
MELT PROCESSABLE ADDITIVE FORMULATIONS

| SAMPLE NO. | CARRIER RESIN | HAL-1 % | HAL-2 % | PROCESS AID-1 % | PIGMENTS & CARRIER RESIN % | FINAL UV TOTAL HALS ON LAYER, ppm |
|---|---|---|---|---|---|---|
| 5 | PP | 1.5 | 0.17 | 1 | 97.33 | 300–1,000 |
| 6 | PE | 1.5 | 0.17 | 1 | 97.33 | 300–1,000 |
| 7 | PP | 4.5 | 0.5 | 1.67 | 93.33 | 1,000–2,500 |
| 8 | PE | 4.5 | 0.5 | 1.67 | 93.33 | 1,000–2,500 |
| 9 | PP | 0.9 | 0.1 | 2.5 | 87.5 | 2,000–5,000 |
| 10 | PE | 0.9 | 0.1 | 2.5 | 87.5 | 2,000–5,000 |
| 11 | PP | 14.4 | 1.6 | 2.5 | 81.5 | 3,200–8,000 |
| 12 | PE | 14.4 | 1.6 | 2.5 | 81.5 | 3,200–8,000 |
| 13 | PP | 16.2 | 1.8 | 4 | 78 | 3,600–9.000 |
| 14 | PE | 16.2 | 1.8 | 4 | 78 | 3,600–9,000 |
| 15 | PP | 22.5 | 2.5 | 3 | 72 | 5,000–12,500 |
| 16 | PE | 22.5 | 2.5 | 3 | 72 | 5,000–12,500 |
| 17 | PP | 29.7 | 3.3 | 4 | 63 | 6.600–16,500 |
| 18 | PE | 29.7 | 3.3 | 4 | 63 | 6,600–16,500 |
| 19 | PP | 37.5 | 4.17 | 5 | 53.33 | 16,500–21,000 |
| 20 | PE | 37.5 | 4.17 | 5 | 53.33 | 16,500–21,000 |

TABLE 5

SPUNBOND LAYER
MELT PROCESSABLE ADDITIVE FORMULATIONS

| SAMPLE NO. | CARRIER RESIN | HAL-3 % | PROCESS AID-2 % | PIGMENTS & CARRIER RESIN % | FINAL UV TOTAL HALS ON LAYER, ppm |
|---|---|---|---|---|---|
| 21 | PP | 1.67 | 1 | 97.33 | 300–1,000 |
| 22 | PE | 1.67 | 1 | 97.33 | 300–1,000 |
| 23 | PP | 5.0 | 1.67 | 93.33 | 1,000–2,500 |
| 24 | PE | 5.0 | 1.67 | 93.33 | 1,000–2,500 |
| 25 | PP | 1.0 | 2.5 | 87.5 | 2,000–5,000 |
| 26 | PE | 1.0 | 2.5 | 87.5 | 2,000–5,000 |
| 27 | PP | 16.0 | 2.5 | 81.5 | 3,200–8,000 |
| 28 | PE | 16.0 | 2.5 | 81.5 | 3,200–8,000 |
| 29 | PP | 18.0 | 4 | 78 | 3,600–9,000 |
| 30 | PE | 18.0 | 4 | 78 | 3,600–9,000 |
| 31 | PP | 25.0 | 3 | 72 | 5,000–12,500 |
| 32 | PE | 25.0 | 3 | 72 | 5,000–12,500 |
| 33 | PP | 33.0 | 4 | 63 | 6,600–16,500 |
| 34 | PE | 33.0 | 4 | 63 | 6,600–16,500 |
| 35 | PP | 41.67 | 5 | 53.33 | 16,500–21,00 |
| 36 | PE | 41.67 | 5 | 53.33 | 16,500–21,000 |

TABLE 6

MELTBLOWN LAYER
MELT PROCESSABLE ADDITIVE FORMULATIONS

| SAMPLE NO. | CARRIER RESIN | HAL-1 % | HAL-2 % | PROCESS AID-1 % | PIGMENTS & CARRIER RESIN % | FINAL UV TOTAL HALS ON LAYER, ppm |
|---|---|---|---|---|---|---|
| 37 | PP | 1.5 | 0.17 | 1 | 97.33 | 300–1,000 |
| 38 | PP | 4.5 | 0.5 | 1.67 | 93.33 | 1,000–2,500 |
| 39 | PP | 0.9 | 0.1 | 2.5 | 87.50 | 2,000–5,000 |
| 40 | PP | 14.4 | 1.6 | 2.5 | 81.50 | 3,200–8,000 |
| 41 | PP | 16.2 | 1.8 | 4.0 | 78.00 | 3,600–9,000 |
| 42 | PP | 22.5 | 2.5 | 3.0 | 72.00 | 5,000–12,500 |
| 43 | PP | 29.7 | 3.3 | 4.0 | 63.00 | 6,600–16,500 |
| 44 | PP | 37.5 | 4.7 | 5.0 | 53.33 | 16,500–21,000 |

TABLE 7

MELTBLOWN LAYER
MELT PROCESSABLE ADDITIVE FORMULATIONS

| SAMPLE NO. | CARRIER RESIN | HAL-3 % | PROCESS AID-2 % | PIGMENTS & CARRIER RESIN % | FINAL UV TOTAL HALS ON LAYER, ppm |
|---|---|---|---|---|---|
| 45 | PP | 1.67 | 1 | 97.33 | 300–1,000 |
| 46 | PP | 5.0 | 1.67 | 93.33 | 1,000–2,500 |
| 47 | PP | 1.0 | 2.5 | 87.50 | 2,000–5,000 |
| 48 | PP | 16.0 | 2.5 | 81.50 | 3,200–8,500 |
| 49 | PP | 18.0 | 4.0 | 78.00 | 3,600–9,000 |
| 50 | PP | 25.0 | 3.0 | 72.00 | 5,000–15,000 |
| 51 | PP | 33.0 | 4.0 | 63.00 | 6,600–16,500 |
| 52 | PP | 41.67 | 5.0 | 53.33 | 16,500–21,000 |

Numerous nonwoven fabrics with UV stability and enhanced water barrier properties are made using various combinations of the melt processble formulations described in TABLES 4, 5, 6 and 7 combined with base resins of either polypropylene or polyethylene.

TABLES 5 and 7 formulations include only one HAL, however, in accordance with the invention, the additive formualtions in these Tables are further combined with a UV augmentor including between 15–50 wt. % of a hindered amine stabilizer, preferrably Chimassorb™944 available from Ciba Specialty Chemicals Canada, Mississauga, Ontario, Canada.

Although the meltblown layer melt processable additive formulations only illustrate polypropylene carrier resins, it is encompassed within the invention to include polyethylene resins or mixtures of polypropylene and polyethylene.

The nonwoven fabric of the invention comprises at least three layers, at least one meltblown layer sandwiched between two spunbonded layers. However, other structures are encompassed by the invention including those having additional meltblown or spunbonded web layers. Examples of such fabric structures include spunbond-meltblown-meltblown-spunbond (SMMS),spunbond-meltblown-meltblown-meltblown-spunbond (SMMMS), spunbond-spunbond-meltblown-spunbond-spundbond (SSMSS), spunbond-spunbond-meltblown-meltblown-spunbond-spundbond (SSMMSS), spunbond-spunbond-meltblown-meltblown-meltblown-spunbond-spundbond (SSMMMSS) as well as other composite nonwoven fabrics including additional spunbond or meltblown web layers. In all the embodiments of the invention, the meltblown or spunbonded fiberous webs are laid in the manner desired followed by thermally bonding the layers together.

Polymer properties that influence the ultimate fiber properties in the fabric are molecular weight, molecular weight distribution (MWD) and degree of crystallinity. Generally, the higher the molecular weight and degree of crystallinity, the stronger the final fibers. The MWD determines how the fibers behave in the melt drawn-down stages of fiber formation. This distribution has significant effects on the resultant fibers strengths and processability. In view of these polymer properties and due to melt flow rates, chemical reactions and processability factors of the melt processable additives used herein, a nonwoven fabric having UV stability and enhanced barrier properties has hitherto not been possible before.

An advantage of this invention over prior practice in this area is in the provision of nonwoven fabrics that have UV light stability and enhanced water barrier properties. The preferred embodiments of the invention have been disclosed for the purpose of illustration. Variations and modifications of the disclosed preferred embodiments which fall within the concept of this invention have been described and will also be readily apparent to persons skilled in the art. All such variations and modifications are intended to be encompassed by the claims set forth hereinafter.

What is claimed is:

1. A nonwoven fabric with ultraviolet stability comprising a layer of meltblown fibers sandwiched between first and second layers of spunbonded fibers;

wherein each layer includes a base resin combined with melt processable additives;

said base resin is selected from the group consisting of polypropylene and polyethylene; and said melt processable additives are a mixture of
(i) at least two hindered amine light stabilizers, selected from the group consisting of: 1,3,5-Triazine-2,4,6-triamine,N,N'''-[1,2-ethanediylbis[[4,6-bis-[buty(1,2,2,6,6-pentamethyl-4-piperidinyl)amino]-1,3,4- triazin-2-yl]imino]-3,1 propanediyl]]bis[N', N"-dibutyl-N', N"-bis(1,2,2,6,6-pentamethyl-4 piperidinyl); dimethyl succinate polymer with 4-hydroxy-2,2,6,6-tetramethyl-1-piperidineethanol; Poly[[6-[(1,1,3,3,-tetramethyl butyl)amino]-1,3,5-triazine-2,4-diyl][2,2,6,6-tetramethyl-4-piperidyl)imino]hexamethylene[2,2,6,6-tetramethyl-4-piperidyl)imino]]; and 1,6-Hexanediamine, N,N'-bis(2,2,6,6-tetramethyl-4-piperidinyl)-polymer with 2,4,6,-trichloro-1,3,5-triazine, reaction products with N-butyl-1-butanamine and N-butyl-2,2,6,6-tetramethyl-4-piperidinamine;

(ii) a processing aid selected from the group consisting of hydroxyl amines, phosphites and a combination of hydroxyl amines and phosphites; and (iii) a carrier resin selected from the group consisting of polypropylene, polyethylene and a combination of polypropylene and polyethylene.

2. The nonwoven fabric as defined in claim 1, further comprising at least one additional layer of meltblown fibers; wherein two layers of meltblown fibers are sandwiched between said first and second spunbonded layers.

3. The nonwoven fabric as defined in claim 1, further comprising at least two additional layers of meltblown fibers; wherein three layers of meltblown fibers are sandwiched between said first and second spunbonded layers.

4. The nonwoven fabric as defined in claim 1, further comprising at least two additional layers of spunbonded fibers; wherein an additional spunbonded layer is on top of said first and second layers of spun bonded fibers.

5. The nonwoven fabric as defined in claim 2, further comprising at least two additional layers of spunbonded fibers; wherein an additional spunbonded layer is on top of said first and second layers of spun bonded fibers.

6. The nonwoven fabric as defined in claim 3, further comprising at least two additional layers of spunbonded fibers; wherein an additional spunbonded layer is on top of said first and second layers of spun bonded fibers.

7. The nonwoven fabric as defined in claim 1 wherein at least two of said hindered amine light stabilizers are combined in a ratio of 9:1 to 1:9.

8. The nonwoven fabric as defined in claim 1 wherein the total hindered amine light stabilizers present in the fabric layer are in amounts ranging from 500 ppm to 25,000 ppm.

9. The nonwoven fabric as defined in claim 1 wherein said processing aid is hydroxyl amine(bis(hydrogenated tallow alkyl)amines, oxidized and Tris(2,4-di-tert-butylphenyl) phosphite.

10. The nonwoven fabric as defined in claim 1 wherein said processing aid is present in the fabric layer in amounts ranging from 100 ppm to 10,000 ppm.

11. The nonwoven fabric as defined in claim 1 wherein said carrier resin is polyethylene with a melt index from 1 to 20.

12. The nonwoven fabric as defined in claim 1 wherein said carrier resin is polypropylene with a melt flow rate between 2 and 60.

13. The nonwoven fabric as defined in claim 1 wherein said carrier resin is a mixture of polypropylene and polyethylene combined in a ratio of 9.5:1 to 1:9.5.

14. The nonwoven fabric as defined in claim 1 wherein said melt processable additives have a combined melt flow rate less than 85.

15. The nonwoven fabric as defined in claim 1 wherein the fabric layer further comprises color pigments added at levels up to 10 wt %.

16. The nonwoven fabric as defined in claim 1 wherein said meltblown and spunbonded layers are thermally bonded together.

17. The nonwoven fabric as defined in claim 1 wherein said meltblown and said spunbonded layers are made from the same base resin and melt processable additives.

18. The nonwoven fabric as defined in claim 1 wherein said meltblown and said spunbonded layers are made from different base resin.

19. The nonwoven fabric as defined in claim 1 wherein said meltblown and said spunbonded layers comprise different light stabilizers.

20. The nonwoven fabric as defined in claim 1 wherein said meltblown and said spunbonded layers comprise different processing aids.

21. The nonwoven fabric as defined in claim 1 wherein said meltblown and said spunbonded layers comprise different carrier resin.

22. A nonwoven fabric with ultraviolet light stability comprising a layer of meltblown fibers sandwiched between first and second layers of spunbonded fibers, wherein each layer comprises:

(a) 80 to 99.0 wt % of a base resin selected from the group consisting of polypropylene, polyethylene, polyester and polyamide;

(b) more than 0% and up to 10% of an ultraviolet color concentrate comprising:

(i) at least a first hindered amine light stabilizer selected from the group consisting of 1,3,5-Triazine-2,4,6-triamine,N,N'"-[1,2ethanediylbis[[4,6-bis-[buty(1,2,2,6,6-pentamethyl-4-piperidinyl)amino]-1,3,4-triazin-2-yl]imino]-3,1 propanediyl]]bis[N',N"-dibutyl-N',N"-bis(1,2,2,6,6-pentamethyl-4 piperidinyl); dimethyl succinate polymer with 4-hydroxy-2,2,6,6-tetramethyl-1-piperidineethanol; Poly[[6-[(1,1,3,3,-tetramethyl butyl)amino]-1,3,5-triazine-2,4-diyl][2,2,6,6-tetramethyl-4-piperidyl)imino]hexa-methylene[2,2,6,6-tetramethyl-4-piperidyl)imino]]; and 1,6-Hexanediamine, N,N'-bis(2,2,6,6-tetramethyl-4-piperidinyl)-polymer with 2,4,6,-trichloro-1,3,5-triazine, reaction products with N-butyl-1-butanamine and N-butyl-2,2,6,6-tetramethyl-4-piperidinamine;

(ii) a first processing aid selected from the group consisting of hydroxyl amines, phosphites, and a combination of hydroxyl amines and phosphites;

(iii) a first carrier resin selected from the group consisting of polypropylene, polyethylene and a combination of polypropylene and polyethylene; and (iv) pigments; and (c) more than 0% and up to 10% of an ultraviolet augmentor comprising:

(i) a second hindered amine light stabilizer;

(ii) a second processing aid selected from the group consisting of phosphites; and (iii) a second carrier resin selected from the group consisting of polypropylene, polyethylene and a combination of polypropylene and polyethylene.

23. The nonwoven fabric as defined in claim 22 wherein said ultraviolet color concentrate contains at least two of said hindered amine light stabilizers which are combined in a ratio of 9:1 to 1:9.

24. The nonwoven fabric as defined in claim 22 herein the hindered amine light stabilizers are present in the fabric layer in amounts ranging from 1000 ppm to 25,000 ppm.

25. The nonwoven fabric as defined in claim 22 wherein said first processing aid is hydroxyl amine(bis(hydrogenated tallow alkyl)amines, oxidized and Tris(2,4-di-tert-butylphenyl)phosphite.

26. The nonwoven fabric as defined in claim 22 wherein said first and second processing aids are present in the fabric layer in amounts ranging from 100 ppm to 10,000 ppm.

27. The nonwoven fabric as defined in claim 22 wherein said first carrier resin is polypropylene with a melt flow rate between 2 and 60.

28. The nonwoven fabric as defined in claim 22 wherein said first carrier resin is a mixture of polypropylene and polyethylene combined in a ratio of 9.5:1 to 1:9.5.

29. The nonwoven fabric as defined in claim 22 wherein said ultraviolet color concentrate and said ultraviolet augmentor each have a melt flow rate less than 85.

30. The nonwoven fabric as defined in claim 22 wherein said pigments are added at levels up to 10 wt % of said ultraviolet color concentrate.

31. The nonwoven fabric as defined in claim 22 wherein said meltblown and spundbonded layers are thermally bonded together.

32. The nonwoven fabric as defined in claim 22 further comprising at least two layers of meltblown fibers sandwiched between said first and second spunbonded layers; wherein the layers are thermally bonded together.

33. The nonwoven fabric as defined in claim 22 further comprising additional spunbonded layers on top of said first and second layers of spunbonded fibers wherein the layers are thermally bonded together.

34. The nonwoven fabric as defined in claim 22 wherein said second carrier is polypropylene with a melt flow rate between 2 and 60.

35. The nonwoven fabic as defined in claim 22 wherein said second carrier is a mixture of polypropylene and polyethylene combined in a ratio of 9.5:1 to 1:9.5.

* * * * *